United States Patent
Sloss

(10) Patent No.: US 7,020,709 B1
(45) Date of Patent: Mar. 28, 2006

(54) SYSTEM AND METHOD FOR FAULT TOLERANT STREAM SPLITTING

(75) Inventor: Reed J. Sloss, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 09/608,417

(22) Filed: Jun. 30, 2000

(51) Int. Cl.
G06F 15/16 (2006.01)

(52) U.S. Cl. .............................. 709/231; 714/4; 714/13

(58) Field of Classification Search ................ 709/105, 709/231–232, 238, 239, 224–226, 233–235; 714/4, 13
See application file for complete search history.

(56) References Cited

U.S. PATENT DOCUMENTS

| | | | |
|---|---|---|---|
| 4,786,130 A | 11/1988 | Georgiou et al. | |
| 4,845,614 A | 7/1989 | Hanawa et al. | |
| 4,866,712 A | 9/1989 | Chao | |
| 4,920,432 A | 4/1990 | Eggers et al. | |
| 4,949,187 A | 8/1990 | Cohen | |
| 4,949,248 A | 8/1990 | Caro | |
| 5,172,413 A | 12/1992 | Bradley et al. | |
| 5,253,341 A | 10/1993 | Rozmanith et al. | |
| 5,291,554 A | 3/1994 | Morales | |
| 5,371,532 A | 12/1994 | Gelman et al. | |
| 5,404,465 A * | 4/1995 | Novakovich et al. | ....... 710/110 |
| 5,410,343 A | 4/1995 | Coddington et al. | |
| 5,414,455 A | 5/1995 | Hooper et al. | |
| 5,440,688 A | 8/1995 | Nishida | |
| 5,442,389 A | 8/1995 | Blahut et al. | |
| 5,442,390 A | 8/1995 | Hooper et al. | |
| 5,442,749 A | 8/1995 | Northcutt et al. | |
| 5,448,723 A * | 9/1995 | Rowett | ........... 714/4 |
| 5,463,768 A | 10/1995 | Cuddihy et al. | |
| 5,475,615 A | 12/1995 | Lin | |
| 5,488,716 A * | 1/1996 | Schneider et al. | ............ 714/10 |
| 5,508,732 A | 4/1996 | Bottomley et al. | |
| 5,515,511 A | 5/1996 | Nguyen et al. | |

(Continued)

FOREIGN PATENT DOCUMENTS

EP    0 649 121 A2    10/1994

(Continued)

OTHER PUBLICATIONS

Berra, P.B., et al.,"Architecture for Distributed Database Systems," *Computer Communications*, vol. 13, No. 4, May 1, 1990, pp. 217-231.

(Continued)

*Primary Examiner*—Rupal Dharia
*Assistant Examiner*—Thomas Duong
(74) *Attorney, Agent, or Firm*—Blakely, Sokoloff, Taylor & Zafman LLP

(57) ABSTRACT

A system is described comprising: a primary root splitter to split a data stream transmitted from an upstream server into a plurality of leaf splitter streams; a plurality of leaf splitters to split each of the leaf splitter streams into a plurality of end user streams, wherein one or more of the plurality of leaf splitters is a backup root splitter; and root splitter reassignment logic for reassigning one of the backup root splitters as a new primary root splitter responsive to detecting a problem with the primary root splitter.

Also described is a method comprising: monitoring a primary root splitter to ensure that the primary root splitter is operating within predefined parameters, the primary root splitter to split a single data stream into multiple data streams transmitted to multiple leaf splitters; and reassigning one of the leaf splitters as a new primary root splitter responsive to detecting that the primary root splitter is not operating within the predefined parameters.

18 Claims, 7 Drawing Sheets

U.S. PATENT DOCUMENTS

| | | | |
|---|---|---|---|
| 5,519,435 | A | 5/1996 | Anderson |
| 5,528,281 | A | 6/1996 | Grady et al. |
| 5,544,313 | A | 8/1996 | Shachnai et al. |
| 5,544,327 | A * | 8/1996 | Dan et al. .................. 709/234 |
| 5,550,577 | A | 8/1996 | Verbiest et al. |
| 5,550,863 | A | 8/1996 | Yurt et al. |
| 5,550,982 | A | 8/1996 | Long et al. |
| 5,557,317 | A | 9/1996 | Nishio et al. |
| 5,568,181 | A | 10/1996 | Greenwood et al. |
| 5,614,940 | A | 3/1997 | Cobbley et al. |
| 5,703,938 | A | 12/1997 | Lucas et al. |
| 5,704,031 | A | 12/1997 | Mikami et al. |
| 5,774,660 | A | 6/1998 | Brendel et al. |
| 5,778,187 | A * | 7/1998 | Monteiro et al. .......... 709/231 |
| 5,832,069 | A | 11/1998 | Waters et al. |
| 5,923,840 | A | 7/1999 | Desnoyers et al. |
| 5,933,835 | A | 8/1999 | Adams et al. |
| 5,956,716 | A | 9/1999 | Kenner et al. |
| 5,987,621 | A | 11/1999 | Duso et al. |
| 6,003,030 | A | 12/1999 | Kenner et al. |
| 6,011,881 | A | 1/2000 | Moslehi et al. |
| 6,016,509 | A | 1/2000 | Dedrick |
| 6,016,512 | A | 1/2000 | Huitema |
| 6,023,470 | A | 2/2000 | Lee et al. |
| 6,026,452 | A | 2/2000 | Pitts |
| 6,032,194 | A * | 2/2000 | Gai et al. .................. 709/239 |
| 6,061,504 | A * | 5/2000 | Tzelnic et al. ............. 709/219 |
| 6,067,545 | A | 5/2000 | Wolff |
| 6,070,191 | A | 5/2000 | Narendran et al. |
| 6,078,960 | A * | 6/2000 | Ballard ....................... 709/229 |
| 6,085,193 | A | 7/2000 | Malkin et al. |
| 6,098,096 | A | 8/2000 | Tsirgotis et al. |
| 6,108,703 | A | 8/2000 | Leighton et al. |
| 6,112,223 | A * | 8/2000 | Chadwick et al. ......... 709/201 |
| 6,112,239 | A * | 8/2000 | Kenner et al. ............. 709/224 |
| 6,112,249 | A * | 8/2000 | Bader et al. ................ 709/239 |
| 6,115,752 | A | 9/2000 | Chauhan |
| 6,122,752 | A | 9/2000 | Farah |
| 6,151,632 | A * | 11/2000 | Chaddha et al. ........... 709/231 |
| 6,161,008 | A | 12/2000 | Lee et al. |
| 6,173,411 | B1 * | 1/2001 | Hirst et al. .................... 714/4 |
| 6,178,445 | B1 | 1/2001 | Dawkins et al. |
| 6,182,143 | B1 * | 1/2001 | Hastings et al. ........... 709/231 |
| 6,195,680 | B1 * | 2/2001 | Goldszmidt et al. ....... 709/203 |
| 6,233,618 | B1 | 5/2001 | Shannon |
| 6,233,623 | B1 | 5/2001 | Jeffords et al. |
| 6,240,462 | B1 | 5/2001 | Agraharam et al. |
| 6,266,335 | B1 | 7/2001 | Bhaskaran |
| 6,292,905 | B1 * | 9/2001 | Wallach et al. ................ 714/4 |
| 6,298,376 | B1 | 10/2001 | Rosner et al. |
| 6,298,455 | B1 * | 10/2001 | Knapman et al. ............ 714/43 |
| 6,314,525 | B1 * | 11/2001 | Mahalingham et al. ........ 714/4 |
| 6,317,787 | B1 | 11/2001 | Boyd et al. |
| 6,324,582 | B1 | 11/2001 | Sridhar et al. |
| 6,330,250 | B1 | 12/2001 | Curry et al. |
| 6,332,157 | B1 | 12/2001 | Mighdoll et al. |
| 6,345,294 | B1 | 2/2002 | O'Tool et al. |
| 6,351,775 | B1 * | 2/2002 | Yu .............................. 709/238 |
| 6,351,776 | B1 | 2/2002 | O'Brien et al. |
| 6,363,416 | B1 | 3/2002 | Naeimi et al. |
| 6,370,571 | B1 | 4/2002 | Medin, Jr. |
| 6,388,995 | B1 * | 5/2002 | Gai et al. .................... 370/256 |
| 6,389,462 | B1 | 5/2002 | Cohen et al. |
| 6,408,407 | B1 | 6/2002 | Sadler |
| 6,415,323 | B1 * | 7/2002 | McCanne et al. ........... 709/225 |
| 6,415,368 | B1 | 7/2002 | Glance et al. |
| 6,421,714 | B1 | 7/2002 | Rai et al. |
| 6,427,163 | B1 | 7/2002 | Arendt et al. |
| 6,438,595 | B1 * | 8/2002 | Blumenau et al. .......... 709/226 |
| 6,442,588 | B1 | 8/2002 | Clarke et al. |
| 6,446,224 | B1 | 9/2002 | Chang et al. |
| 6,466,949 | B1 | 10/2002 | Yang et al. |
| 6,484,143 | B1 | 11/2002 | Swildens et al. |
| 6,487,555 | B1 | 11/2002 | Bharat et al. |
| 6,502,125 | B1 | 12/2002 | Kenner et al. |
| 6,502,205 | B1 | 12/2002 | Yanai et al. |
| 6,505,240 | B1 * | 1/2003 | Blumenau ................... 709/218 |
| 6,564,380 | B1 * | 5/2003 | Murphy ........................ 725/86 |
| 6,594,786 | B1 * | 7/2003 | Connelly et al. ............. 714/50 |
| 6,598,071 | B1 | 7/2003 | Hayashi et al. |
| 6,665,726 | B1 * | 12/2003 | Leighton et al. ............ 709/231 |

FOREIGN PATENT DOCUMENTS

| | | |
|---|---|---|
| EP | 0 651 554 A1 | 10/1994 |
| WO | WO974 2582 A | 11/1997 |
| WO | WO 98/59486 | 12/1998 |
| WO | WO 99 48246 A | 9/1999 |

OTHER PUBLICATIONS

Little, T.D.C., et al., "Selection and Disseminatrion of Digital Video via the Virtual Video Broswer," *Multimedia Tools and Applications,* vol. 1, No. 2, Jun. 1995 (Netherlands), pp. 149-172.

Vin, Harrick, Multimedia Broadcasting Over The Internet: Part 1, Oct. 1998, IEEE Multimedia, IEEE Computer Society, US, vol. 5, NR.4, pp.: 78-82 XP000788442, ISN: 1070-986X—Entire document.

* cited by examiner

SYSTEM AND METHOD FOR FAULT TOLERANT STREAM SPLITTING

BACKGROUND OF THE INVENTION

1. Field of the Invention

This invention relates generally to the field of network services. More particularly, the invention relates to an improved architecture for providing fault tolerant data communication.

2. Description of the Related Art

As is known in the art, streaming is a mechanism for playing back audio and/or video content over a network in real-time, typically used in situations where network bandwidth is limited. The basic streaming concept is that the destination (e.g., a client) begins to play back the underlying streaming file from a buffer before the entire file has been received from its source.

A traditional network streaming system is illustrated in FIG. 1. As shown, one or more clients 150, 160, configured with streaming application software such as RealPlayer® from RealNetworks® or Windows Media® Player from Microsoft® Corporation, communicate with one or more streaming servers 110, 111, . . . N, over a network 100 (e.g., the Internet). The group of streaming servers 110, 111, . . . N, are located together at a point of presence ("POP") site 130. Each of the streaming servers 110, 111, . . . N, may store a copy of the same streaming data or, alternatively, may store different streaming data, depending on the configuration at the POP site 130.

In operation, when a client 150 requests a particular streaming file from a server at the POP site 120, the request is received by a load balancer module 130, which routes the request to an appropriate streaming server 111. Which server is "appropriate" may depend on where the requested file is stored, the load on each server 110, 111, . . . N, and/or the type of streaming file requested by the client (e.g., Windows Media format or RealPlayer format). Once the file has been identified by the load balancer 120 on an appropriate server—server 111 in the illustrated example—it is streamed to the requesting client 150 (represented by stream 140) through the network 100.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

AN EXEMPLARY NETWORK ARCHITECTURE

Figure 1:
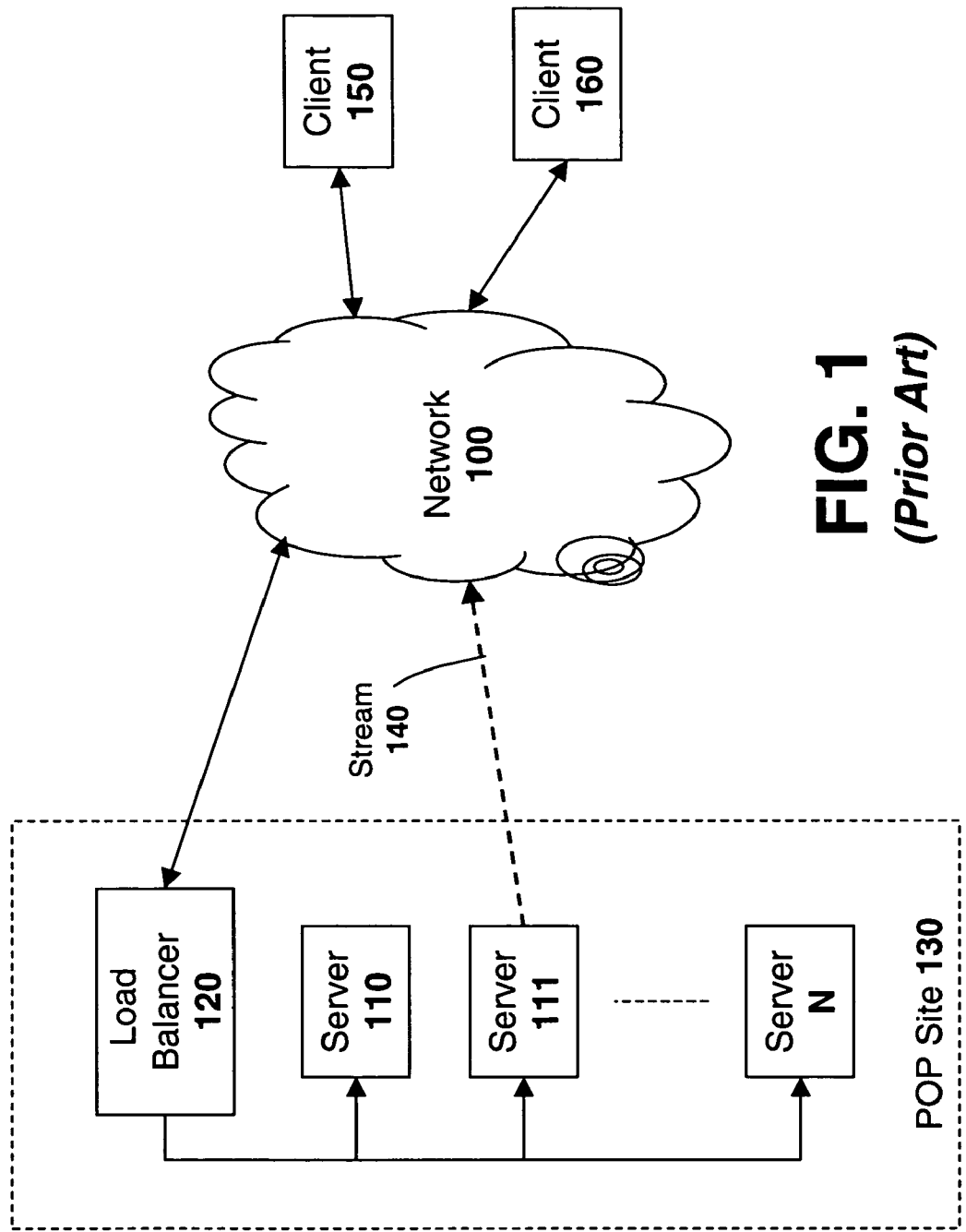
FIG. 1 illustrates a prior art system and method for streaming content over a network.
Figure 2:
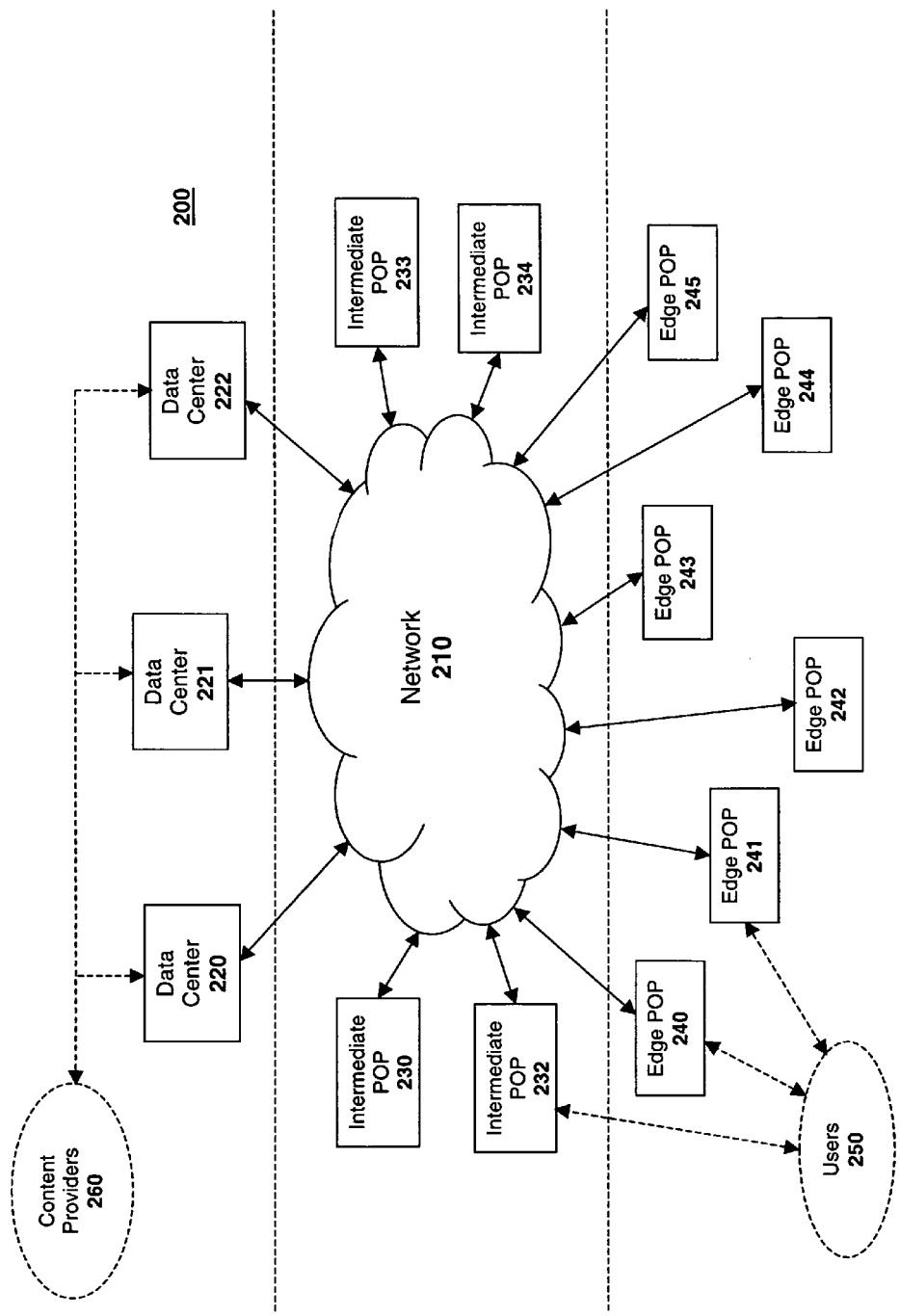
FIG. 2 illustrates an exemplary network architecture including elements of the invention.

Elements of the present invention may be included within a multi-tiered networking architecture 200 such as that illustrated in FIG. 2, which includes one or more data centers 220–222, a plurality of "intermediate" Point of Presence ("POP") nodes 230–234 (also referred to herein as "Private Network Access Points," or "P-NAPs"), and a plurality of "edge" POP nodes 240–245 (also referred to herein as "Internet Service Provider Co-Location" sites or "ISP Co-Lo" sites).

According to the embodiment depicted in FIG. 2, each of the data centers 220–222, intermediate POPs 230–234 and/or edge POPs 240–245 are comprised of groups of network servers on which various types of network content may be stored and transmitted to end users 250, including, for example, Web pages, network news data, e-mail data, File Transfer Protocol ("FTP") files, and live & on-demand multimedia streaming files. It should be noted, however, that the underlying principles of the invention may be practiced using a variety of different types of network content.

The servers located at the data centers 220–222 and POPs 230–234; 240–245 may communicate with one another and with end users 250 using a variety of communication channels, including, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular.

In addition, various networking protocols may be used to implement aspects of the system including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

In one embodiment, a database for storing information relating to distributed network content is maintained on servers at the data centers 220–222 (and possibly also at the POP nodes 230–234; 240–245). This information may include the different POP sites which currently contain a copy of network content. The database in one embodiment is a distributed database (i.e., spread across multiple servers) and may run an instance of a Relational Database Management System (RDBMS), such as Microsoft™ SQL-Server, Oracle™ or the like.

AN EXEMPLARY COMPUTER ARCHITECTURE

Figure 3:
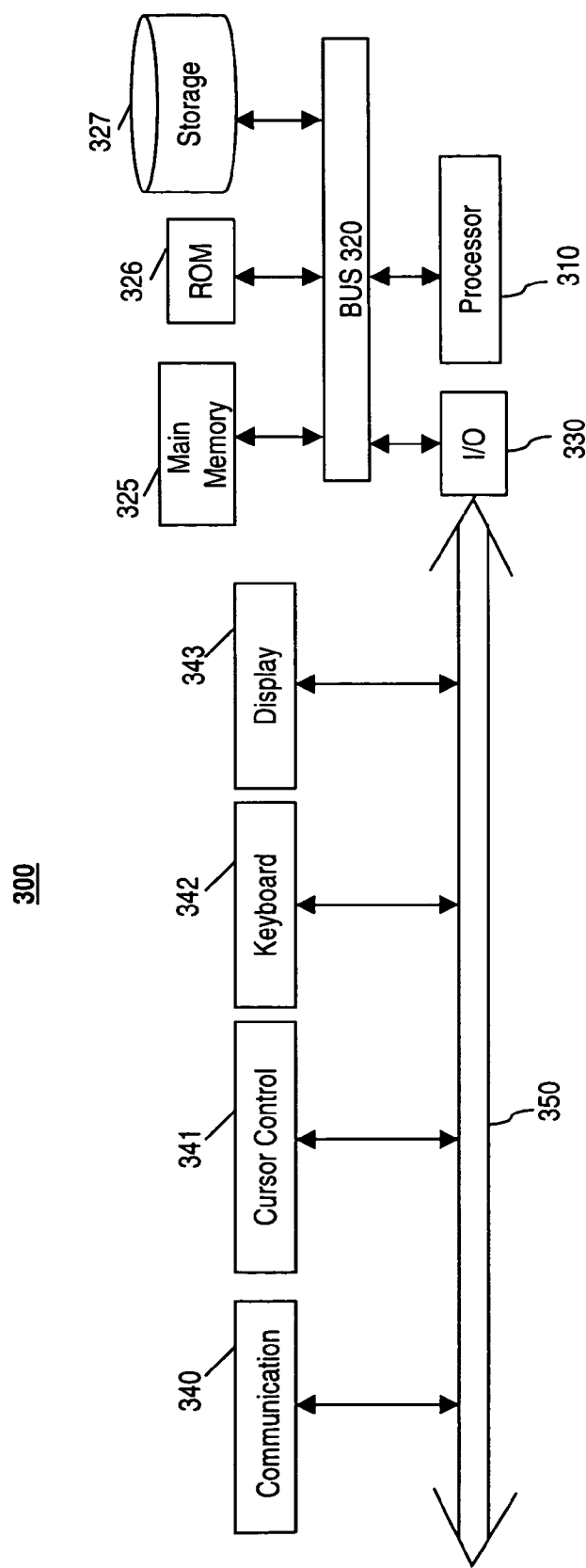
FIG. 3 illustrates an exemplary computer architecture including elements of the invention.

Having briefly described an exemplary network architecture which employs various elements of the present invention, a computer system 300 representing exemplary clients and servers for implementing elements of the present invention will now be described with reference to FIG. 3.

One embodiment of computer system 300 comprises a system bus 320 for communicating information, and a processor 310 coupled to bus 320 for processing information. The computer system 300 further comprises a random access memory (RAM) or other dynamic storage device 325 (referred to herein as "main memory"), coupled to bus 320 for storing information and instructions to be executed by processor 310. Main memory 325 also may be used for storing temporary variables or other intermediate information during execution of instructions by processor 310. Computer system 300 also may include a read only memory ("ROM") and/or other static storage device 326 coupled to bus 320 for storing static information and instructions used by processor 310.

A data storage device 327 such as a magnetic disk or optical disc and its corresponding drive may also be coupled to computer system 300 for storing information and instructions. The computer system 300 can also be coupled to a second I/O bus 350 via an I/O interface 330. A plurality of I/O devices may be coupled to I/O bus 350, including a display device 343, and/or an input device (e.g., an alphanumeric input device 342 and/or a cursor control device 341).

The communication device 340 is used for accessing other computers (servers or clients) via a network 100. The communication device 340 may comprise a modem, a network interface card, or other well known interface device, such as those used for coupling to Ethernet, token ring, or other types of computer networks.

EMBODIMENTS OF THE INVENTION

Stream Splitting

Figure 4:
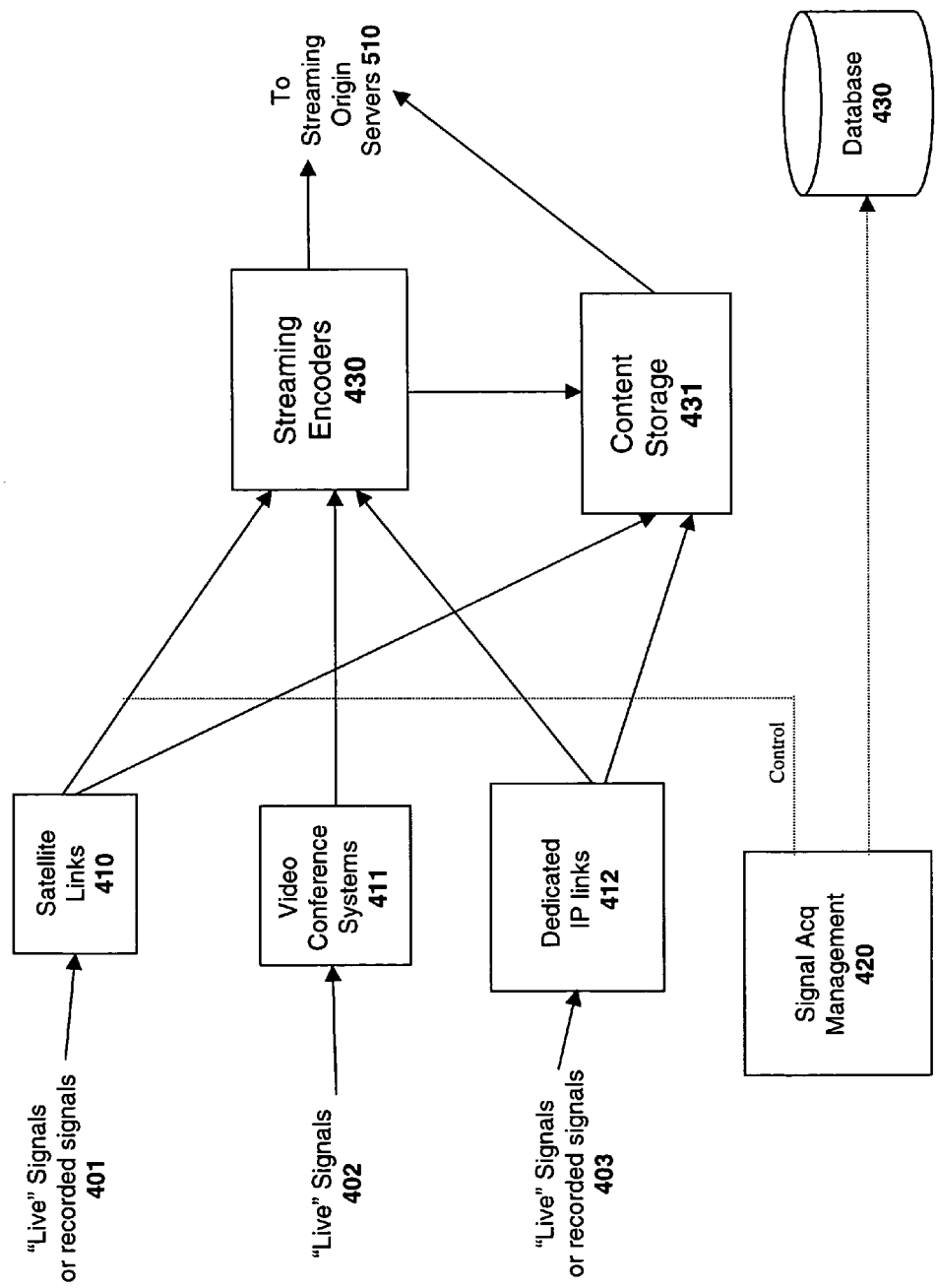
FIG. 4 illustrates various streaming sources supported by one embodiment of the invention.

Embodiments of a system configured to stream live and on-demand audio/video content will now be described with respect to FIGS. 4 and 5. As shown in FIG. 4, one embodiment receives and processes incoming audio/video content from a variety of sources including, but not limited to, live or recorded signals 401 broadcast over satellite links 410; live signals 402 provided via video conferencing systems 411; and/or live or recorded signals 403 transmitted over dedicated Internet Protocol ("IP") links 412. It should be noted, however, that various other network protocols (i.e., other than IP) may be employed while still complying with the underlying principles of the invention. In one embodiment, each of the modules illustrated in FIG. 4 reside at a data center 220.

System acquisition and management modules ("SAMs") 420 open and close communication sessions between the various sources 401–403 as required. For example, when a content provider wants to establish a new live streaming session, the SAM 420 will open a new connection to handle the incoming audio/video data (e.g., after determining that the content provider has the right to establish the connection).

The SAM module 420 will handle incoming signals differently based on whether the signals have already been encoded (e.g., by the content providers) and/or based on whether the signals are comprised of "live" or "on demand" content. For example, if a signal has not already been encoded by a content provider (e.g., the signal may be received at the data center 220 in an analog format or in a non-streaming digital format), the SAM module 420 will direct the signal to one or more streaming encoder modules 430, which will encode the stream in a specified digital streaming format (e.g., Windows Media® format, Real G2™ format, . . . etc).

If the incoming signal is live, the streaming encoders 430 transmit the encoded signal directly to one or more streaming origin servers 510 (which distribute the signal to various POP nodes as described below) and/or to one or more content storage devices 431 at the data center 220. If, however, the incoming signal is an on-demand signal (i.e., to be stored and viewed by clients at any time), then the streaming encoders 430 transmit the encoded signal directly to the content storage devices 431. Similarly, if the incoming signal is already encoded in a particular streaming format, it may be transmitted directly to the content storage devices 431.

As new audio/video streaming content is added to the content storage devices 431, the SAM module 420 causes a storage database 430 to be updated accordingly (e.g., via a content delivery subsystem). The storage database 430 in one embodiment is a distributed database which tracks all network content as it is distributed and stored at various POP sites throughout the network.

Figure 5:
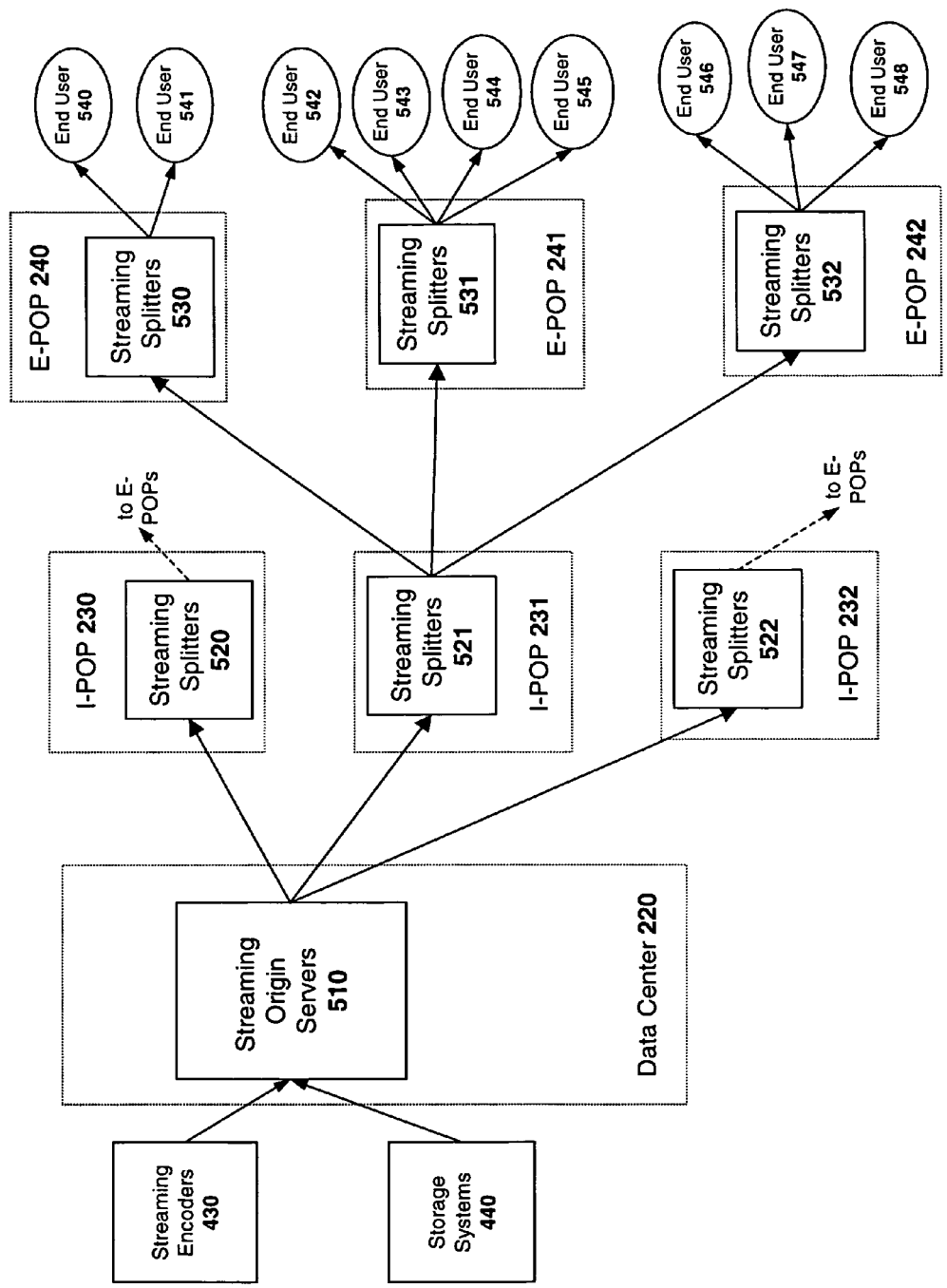
FIG. 5 illustrates stream splitting implemented in on embodiment of the invention.

As illustrated in FIG. 5, the encoded signal is transmitted from the streaming origin servers 510 to streaming splitters 520–522, 530–532 located at a various I-POP nodes 230–232 and E-POP nodes 240–242. Employing streaming splitters as illustrated conserves a substantial amount of network bandwidth. For example, in the illustrated embodiment each streaming splitter 520–522, 530–532 receives only a single stream of live audio/video content from an upstream server, which it then divides into several independent streams. This configuration is particularly useful for streaming configurations which do not support multicasting.

Moreover, employing streaming splitters within a multitiered hierarchy, as illustrated in FIG. 5, reduces bandwidth at each level in the hierarchy. For example, a single stream from a live streaming event may be transmitted from a streaming origin server 510 to an I-POP streaming splitter 521. The streaming splitter 521 may then transmit a single stream to each of the E-POP streaming splitters 530–532, which may then transmit the live event to a plurality of end users 540–548. Accordingly, the network path between the data center 220 and the I-POP 231 is loaded with only a single stream and each of the three network paths between the I-POP 231 and the E-POPs 240–242 are loaded with only a single stream. The incoming streams are then split at each of the E-POPs 240–242 to provide the live event to a plurality of end users 540–548.

Fault Tolerant Stream Splitting

Figure 6:
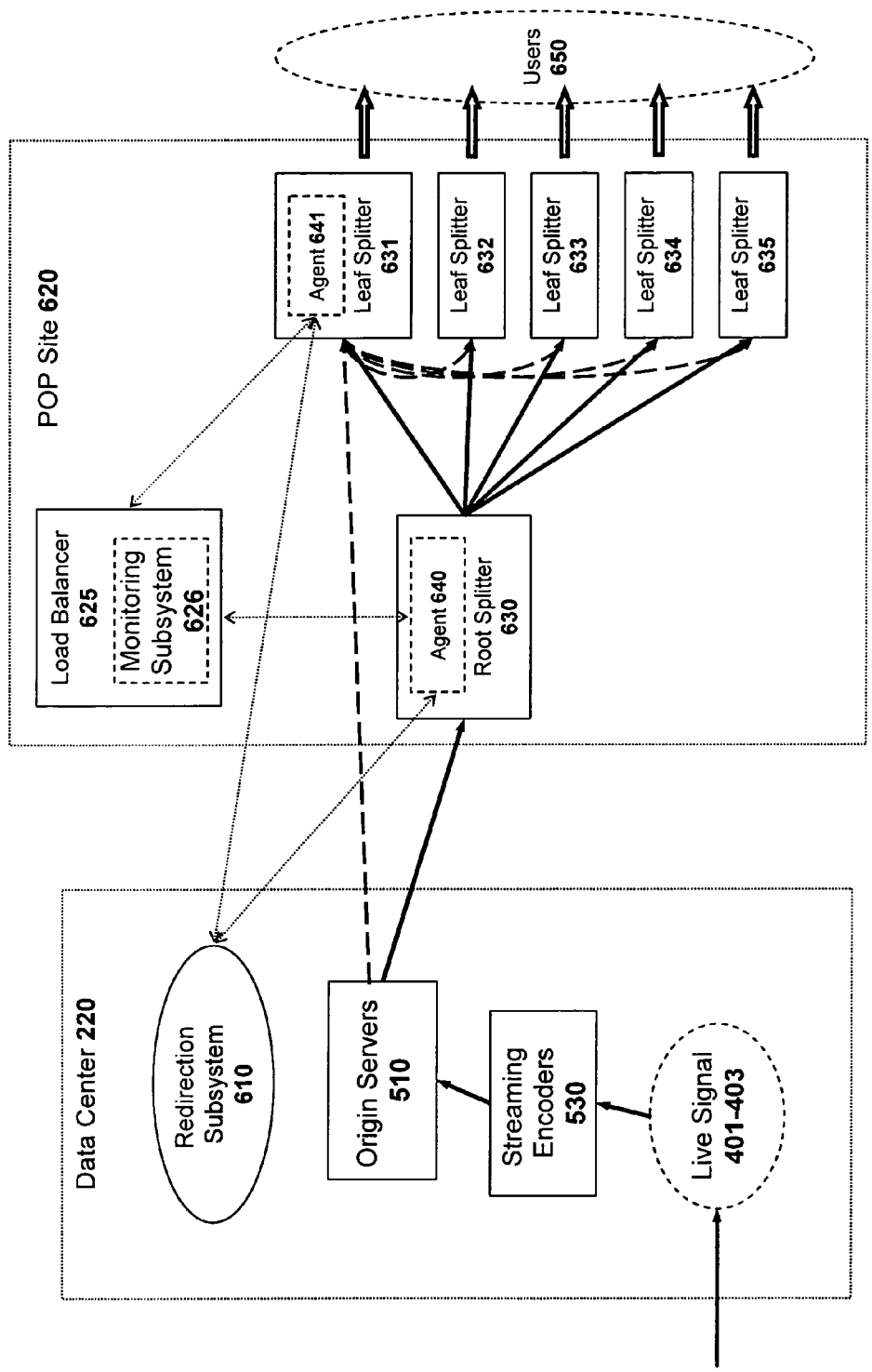
FIG. 6 illustrates a system for implementing a backup root splitter according to one embodiment of the invention.

As illustrated in FIG. 6, one embodiment of the invention includes one or more root splitters 630 configured at POP sites 620 to receive a stream from an origin server and distribute the stream to a plurality of leaf splitters 631–635. Each of the leaf splitters 631–635 serve a plurality of end users 650 by further splitting each stream received from the root splitter 630 into another plurality of end-user streams.

It can be seen from FIG. 6 that, for a particular live or scheduled streaming event, the streaming encoder 530, the origin servers 510 and the root splitter 630 all represent single points of failure. In one embodiment, potential failures at the data center 200 components (i.e., the origin server 510 and streaming encoder 530) are handled through allocation of redundant encoder/origin server pair combinations for each live/scheduled event. However, in some circumstances, this level of redundancy may be impractical at various POP sites 620 (e.g., due to limited media server resources at the site, limited and costly rack space, . . . etc). As such, in one embodiment, a more efficient mechanism may be implemented to provide fault tolerance at these POP sites 620.

As illustrated in FIG. 6, in one embodiment, one or more of the leaf splitters (e.g., leaf splitter 631) are configured as backups to the primary root splitter 630. In this embodiment, the health of the root splitter is continually monitored by a monitoring subsystem 626 which may reside on the load balancer module 625, the redirection subsystem 625, or as a separate monitoring module and the data center and/or the POP site 620.

In one embodiment, the root splitter 630 is configured to provide an update to the monitoring subsystem 626 at predetermined intervals. This may be accomplished by an agent 640 continually running on the root splitter 630 and configured to communicate with the monitoring subsystem 626. The periodic update in this embodiment acts as a "heartbeat" which indicates to the monitoring subsystem 626 that the root splitter is operating within normal parameters. If the monitoring subsystem 626 does not receive an update for one or more periods, it may determine that the root splitter has become inoperative and assign the backup root splitter 631 as the new primary root splitter. In one embodiment, the agent 641 running on the backup root splitter 631 performs the reconfiguration process. Alternatively, or in addition, the monitoring subsystem 626 may actively poll the agent 640 running on the root splitter 630 to verify that the root splitter 630 is operating reliably.

Figure 7:
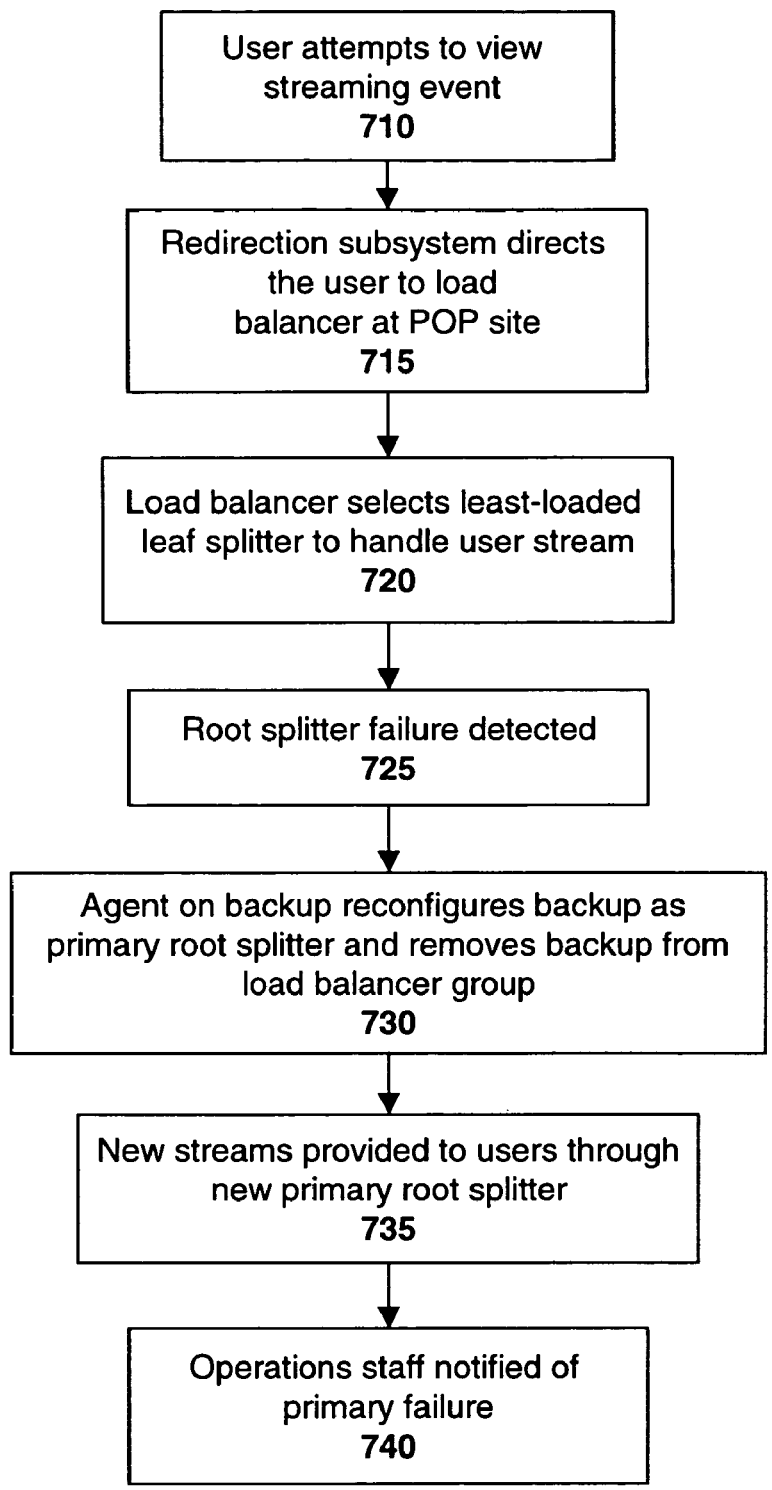
FIG. 7 illustrates a method for implementing a backup root splitter according to one embodiment of the invention.

The operation of one embodiment of the system illustrated in FIG. 6 will now be described with respect to the flowchart in FIG. 7. At 710, a user attempts to view a particular live or scheduled streaming event (e.g., such as a Webcast). The user's request is received and processed by the redirection subsystem 610, which (at 715) directs the user to a particular POP site 620 from which the stream will be delivered (e.g., by returning a path directing the user's streaming application that POP site 620).

At 720, a load balancer module 625 residing at the POP site 620 selects a particular leaf splitter (e.g., splitter 633) from a group of leaf splitters 631–635 at the site. In one embodiment, the load balancer 625 is a layer 4 switch which continually monitors the load on each of the leaf splitters 631–635, and assigns the new user request to the least-loaded splitter. In this embodiment, the layer 4 switch may be identified by a virtual internet protocol ("VIP") address included in the path sent by the redirection subsystem 610.

At 725, a root splitter failure is detected by the monitoring subsystem 626 (e.g., via one or more of the failure detection techniques described above). As a result, the monitoring subsystem 626 directs the backup root splitter 631 (e.g., via the backup agent 641) to reconfigure itself as the new primary root splitter 630. In addition, the monitoring subsystem 626 and/or the backup agent 641 directs the load balancer 625 to remove the backup root splitter 631 from the group of leaf splitters 631–635 monitored by the load balancer module 625.

It should be noted that the new primary root splitter 631, load balancer 625, leaf splitters 632–625, and/or redirection subsystem 610 may be reconfigured differently following a root splitter 630 failure depending on the streaming formats supported by the system. When a user requests a file encoded in a RealPlayer® streaming format (e.g., through a RealPlayer application residing on the client computer) the redirection subsystem transmits a comprehensive path to the user, specifying the location of the streaming file and the servers through which the data stream will pass on its way to the user. For example, a path such as "rtsp:\\<VIP>\Split<Root Server IP>\Split\<Origin Server IP>\<Encoder IP>\live_stream.rm" may be passed to the client's streaming application, identifying the virtual IP address of the load balancer 625, the root splitter 630, the origin server 510, and the encoder 530 as well as the name of the actual streaming file ("live_stream.rm"). Accordingly, when the backup root server 631 is reconfigured as the primary root server 630 as described above, the path subsequently transmitted to users by the redirection subsystem 610 is updated to reflect the new IP address of the root splitter in the <Root Server IP> field (i.e., the IP address of the former backup server 631).

By contrast, if the system is configured to support the Windows Media Technologies ("WMT") streaming format, each server within the streaming path may need to be updated following a root splitter 630 crash. More particularly, in this embodiment, WMT server "publishing points" are reconfigured beforehand on each server to point back to the upstream splitter 630, origin server 510, and/or encoder 530.

For example, following a user request for streaming content an exemplary URL returned by the Redirection Subsystem 610 may look something like: "mms://<VIP>/<Broadcast Publishing Point(3)>." Each edge splitter behind the VIP address would then expose "Broadcast Publishing Point(3)" and would thereby be configured to reference, for example, "<Root Splitter IP>/<Broadcast Publishing Point (2)>." Continuing with this example, the WMT root splitter 630, in turn, would expose "Broadcast Publishing Point(2)" which would be pre-configured to reference "<Origin Server IP>/<Broadcast Publishing Point(1)>." Finally, "Broadcast Publishing Point(1)," exposed by the WMT origin server 510 in one embodiment, would be filled with the stream received from the streaming encoder 530.

Thus, in this embodiment, when the monitoring subsystem 626 detects a failure in the primary WMT root splitter 630, it must not only reconfigure the load balancer 625 to remove the backup root splitter 631 from the leaf splitter group, it must also reconfigure all the "Broadcast Publishing Point(3)" on the remaining leaf splitters 632–635 so that they reference the new root splitter 631. In addition, the new root splitter 631 must be reconfigured to remove its "Broadcast Publishing Point(3)" and now expose "Broadcast Publishing Point(2)," which points back to the origin server's 510's publishing point.

Accordingly, in can be seen that one of the benefits of the foregoing configuration is that the Redirection Subsystem 610 can offer up the same URL to the user, even after the primary root splitter 630 fails. The user will then be provided the same stream using a newly-configured set of publishing points.

Regardless of which streaming format is used, new streams are provided to users through the new primary root splitter at 735. At 740, the operations staff at the data center is notified of the primary root server failure. The operations staff may then attempt to evaluate and solve the problem remotely before making a trip to the POP site 620.

Embodiments of the present invention include various steps, which have been described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the foregoing embodiments were described in the context of specific streaming formats (e.g., Windows Media and RealMedia), various other streaming media formats may be implemented consistent with the underlying principles of the invention. Accordingly, the scope and spirit of the invention should be judged in terms of the claims which follow.

What is claimed is:

1. A system comprising:
    a primary root splitter to split a data stream transmitted from an upstream server into a plurality of leaf splitter streams;
    a plurality of leaf splitters to split each of said leaf splitter streams into a plurality of end user streams, wherein one or more of said plurality of leaf splitters is a backup root splitter;
    a monitoring subsystem to monitor the status of the primary root splitter; and
    an agent to reconfigure one of said backup root splitters as a new primary root splitter responsive to detecting a problem with said primary root splitter, said new primary root splitter to split the data stream transmitted from the upstream server.

2. The system as in claim 1 further comprising a load balancer module to direct client streaming requests to particular leaf splitters based on relative load on said leaf splitters.

3. The system as in claim 1 further comprising a redirection subsystem to redirect client streaming requests to a particular point of presence site.

4. The system as in claim 2 further comprising load balancer update logic for removing said backup leaf splitter from said plurality of leaf splitters to which said load balancer directs user streaming requests responsive to said backup root splitter being reassigned as a primary root splitter.

5. The system as in claim 3 further comprising redirection subsystem update logic for notifying said redirection subsystem of said new primary root splitter responsive to said backup splitter being reconfigured as said new primary root splitter.

6. The system as in claim 5 wherein said redirection subsystem update logic transmits said new primary root splitter's IP address to said redirection subsystem.

7. The system as in claim 1 further comprising publish point update logic for updating publishing points within said system responsive to said backup root server being reassigned as said primary root server.

8. The system as in claim 1 further comprising:
    a primary root splitter agent to periodically transmit a heartbeat signal to said monitoring subsystem, the heartbeat signal indicating that said primary root splitter is operating within normal parameters.

9. The system as in claim 8 wherein said monitoring subsystem transmits a monitor signal to said primary root splitter agent, and wherein not receiving a response from said primary root splitter agent indicates a problem with said primary root splitter.

10. A computerized method comprising:
    monitoring status of a primary root splitter to ensure that said primary root splitter is operating within predefined parameters, said primary root splitter to split a single data stream transmitted from an upstream server into multiple data streams transmitted to multiple leaf splitters, the leaf splitters to split each of said leaf splitter streams into a plurality of end user streams, wherein one or more of said plurality of leaf splitters is a backup root splitter;
    detecting a problem with the primary root splitter; and
    reconfiguring one of said leaf splitters as a new primary root splitter responsive to detecting that said primary root splitter is not operating within said predefined parameters, said new primary root splitter to split a single data stream transmitted from the upstream server into multiple data streams transmitted to multiple leaf splitters.

11. The computerized method of claim 10 further comprising:
    updating a load balancer module to indicate that said backup leaf splitter is reassigned as a primary root splitter, said load balancer module for distributing user streaming requests to one or more of said leaf splitters based on load on each of said leaf splitters.

12. The computerized method as in claim 10 further comprising:
    updating a redirection subsystem to indicate that said backup leaf splitter is reconfigured as a primary root splitter, said redirection subsystem for directing client streaming requests to a particular point of presence site.

13. The computerized method of claim 12 further comprising:
    updating a load balancer module at said point of presence site to indicate that said backup leaf splitter is reassigned as a new primary root splitter, said load balancer module for distributing user streaming requests to one or more of said leaf splitters at said point of presence site based on load on each of said leaf splitters.

14. The computerized method as in claim 12 wherein updating said redirection subsystem comprises transmitting said new primary root splitter's IP address to said redirection subsystem.

15. The computerized method as in claim 10 further comprising:
    updating one or more broadcast publish points to indicate said new primary root splitter.

16. An article of manufacture including a sequence of instructions which, when executed by a processor, cause said processor to:
    monitor status of a primary root splitter to ensure that said primary root splitter is operating within predefined parameters, said primary root splitter to split a single data stream into multiple data streams transmitted to multiple leaf splitters, the leaf splitters to split each of said leaf splitter streams into a plurality of end user streams, wherein one or more of said plurality of leaf splitters is a backup root splitter;

detect a problem with the primary root splitter; and reconfigure one of said leaf splitters as a new primary root splitter responsive to detecting that said primary root splitter is not operating within said predefined parameters, said new primary root splitter to split the data stream into multiple data streams.

17. The article of manufacture as in claim 16 including additional instructions which, when executed by said processor, cause said processor to:

update a load balancer module to indicate that said leaf splitter is reassigned as a primary root splitter, said load balancer module for distributing user streaming requests to one or more of said leaf splitters based on load on each of said leaf splitters.

18. The article of manufacture as in claim 17 including additional instructions which, when executed by said processor, cause said processor to:

update a redirection subsystem to indicate that said leaf splitter is reassigned as a primary root splitter, said redirection subsystem for directing client streaming requests to a particular point of presence site.

* * * * *